United States Patent
Burdakov et al.

(10) Patent No.: US 10,419,381 B2
(45) Date of Patent: Sep. 17, 2019

(54) PROMPT RANKING

(71) Applicant: Facebook, Inc., Menlo Park, CA (US)

(72) Inventors: Daniil Burdakov, London (GB);
Xiaocong Liang, Menlo Park, CA (US);
Sunyu Duan, London (GB);
Volodymyr Giginiak, London (GB);
Pedro Veras Bezerra da Silva, London (GB)

(73) Assignee: Facebook, Inc., Menlo Park, CA (US)

( * ) Notice: Subject to any disclaimer, the term of this patent is extended or adjusted under 35 U.S.C. 154(b) by 273 days.

(21) Appl. No.: 15/251,493

(22) Filed: Aug. 30, 2016

(65) Prior Publication Data
US 2018/0063062 A1   Mar. 1, 2018

(51) Int. Cl.
*G06F 15/16* (2006.01)
*H04L 12/58* (2006.01)
*H04L 29/08* (2006.01)

(52) U.S. Cl.
CPC ............. *H04L 51/26* (2013.01); *H04L 51/24* (2013.01); *H04L 51/32* (2013.01); *H04L 67/306* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 8,260,921 B2* | 9/2012 | Uyama | ................ | G06Q 10/04 709/226 |
| 8,392,390 B2* | 3/2013 | Bennett | ................ | G06F 17/274 707/705 |
| 8,402,094 B2* | 3/2013 | Bosworth | ............. | G06Q 30/08 705/319 |
| 8,700,636 B2* | 4/2014 | Kao | ...................... | G06Q 10/00 707/748 |
| 8,707,201 B1* | 4/2014 | Aradhye | ............. | G06F 17/3053 715/789 |
| 8,832,854 B1* | 9/2014 | Staddon | ............... | H04L 63/102 726/28 |
| 8,903,927 B2* | 12/2014 | Chen | ..................... | G06Q 50/01 709/206 |
| 8,924,493 B1* | 12/2014 | Yeskel | ................... | G06F 9/542 709/206 |
| 9,083,670 B1* | 7/2015 | Boncha | ................... | H04L 51/32 |
| 9,088,808 B1* | 7/2015 | He | ........................ | H04N 21/251 |
| 9,218,819 B1* | 12/2015 | Stekkelpak | ............ | G10L 15/22 |

(Continued)

*Primary Examiner* — Alicia Baturay
(74) *Attorney, Agent, or Firm* — Baker Botts L.L.P.

(57) ABSTRACT

In one embodiment, a method includes accessing a number of candidate notifications stored on the social-networking system. Each of the candidate notifications includes a prompt to perform an action on the social-networking system. The method also includes generating a user feature vector quantifying features of the user; and assessing, using a machine-learning model, one or more feature vectors in order to calculate an interaction score for each of the candidate notifications. The one or more feature vectors includes the user feature vector. The method also includes ranking each of the candidate notifications based at least in part on the respective calculated interaction score; and providing, based at least in part on the ranking, one or more of the candidate notifications to a client device of the user. Each of the provided candidate notifications satisfies a pre-determined threshold value.

20 Claims, 6 Drawing Sheets

(56) References Cited

U.S. PATENT DOCUMENTS

| | | | |
|---|---|---|---|
| 9,251,395 B1* | 2/2016 | Botchen | G06K 9/00 |
| 9,274,691 B2* | 3/2016 | Coe | G06F 3/04842 |
| 9,282,587 B2* | 3/2016 | Winkler | H04W 88/02 |
| 9,294,333 B1* | 3/2016 | Staddon | H04L 63/102 |
| 9,304,665 B2* | 4/2016 | Coe | G06F 3/04842 |
| 9,306,888 B2* | 4/2016 | Kao | H04L 51/12 |
| 9,311,683 B1* | 4/2016 | Saylor | H04L 67/22 |
| 9,391,993 B1* | 7/2016 | Winer | H04L 63/101 |
| 9,450,901 B1* | 9/2016 | Smullen | H04L 51/046 |
| 9,477,376 B1* | 10/2016 | Stout | G06F 16/335 |
| 9,519,408 B2* | 12/2016 | Shoemaker | G06F 3/0484 |
| 9,621,505 B1* | 4/2017 | Ko | H04L 51/32 |
| 9,654,591 B2* | 5/2017 | Matus | H04L 67/22 |
| 9,693,186 B1* | 6/2017 | Anima | H04W 4/02 |
| 9,787,485 B1* | 10/2017 | Yeskel | G06F 9/542 |
| 9,817,869 B2* | 11/2017 | Aradhye | G06Q 10/107 |
| 9,837,076 B1* | 12/2017 | Stekkelpak | G10L 15/22 |
| 9,854,025 B2* | 12/2017 | Kosslyn | H04L 67/10 |
| 10,033,786 B2* | 7/2018 | Yerli | H04L 67/26 |
| 2009/0150507 A1* | 6/2009 | Davis | H04L 51/14 709/207 |
| 2010/0132049 A1* | 5/2010 | Vernal | G06F 21/6245 726/27 |
| 2012/0166433 A1* | 6/2012 | Tseng | H04W 4/21 707/728 |
| 2012/0166532 A1* | 6/2012 | Juan | G06Q 30/0224 709/204 |
| 2013/0079149 A1* | 3/2013 | Fletcher | G06Q 50/01 463/42 |
| 2014/0157138 A1* | 6/2014 | Kuscher | G06Q 10/10 715/739 |
| 2014/0172550 A1* | 6/2014 | Reddy | G06Q 30/0243 705/14.45 |
| 2015/0058423 A1* | 2/2015 | Chen | G06Q 50/01 709/204 |
| 2016/0337299 A1* | 11/2016 | Lane | H04L 67/10 |
| 2017/0118162 A1* | 4/2017 | Ratiu | H04L 51/14 |
| 2017/0134516 A1* | 5/2017 | Gutman | H04L 67/26 |
| 2017/0149721 A1* | 5/2017 | Brunn | H04L 67/306 |
| 2017/0185650 A1* | 6/2017 | Vainas | G06F 16/24575 |
| 2018/0005194 A1* | 1/2018 | Dotan-Cohen | G06Q 10/1095 |

* cited by examiner

PROMPT RANKING

TECHNICAL FIELD

This disclosure generally relates to ranking notifications.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, users may be prompted to post content stored on their mobile devices or content associated with an event, thereby increasing user engagement. For example, a social-networking system may send a prompt notification to a user to share a photo that is stored on their mobile device. As another example, a social-networking system may prompt the user to check-in while they are a particular landmark. In particular embodiments, a social-networking system may generate a number of candidate prompt notifications for users and ranks each candidate prompt notification based on a calculated posting probability and dismissal probability. Features or characteristics that are a function of how users use each type of candidate prompt notifications are extracted.

In particular embodiments, a machine-learning trained classifier may be used to optimize a predictor function selecting the types of prompt notifications that will most likely result in the user positively responding to the prompt (e.g., post content). Classification may be performed using a predictor function that is constructed using a set of "training" data that includes an input vector and an answer vector. The feature vector maps the values of the aforementioned posting features (e.g., post rates, demographics, location, interests) and dismissal features (e.g., close rate) for a particular user to a n-dimensional feature vector. The answer vector may be a vector of the result of the prompt notification (e.g., whether or not the user posted content or dismissed the prompt notification). The learned association of the machine-learning classifier may be used to optimize the set of weights of the linear predictor function. In particular embodiments, the predictor function may be a weighted function of the posting probability, dismissal probability, and impressions (the number of times a post is displayed). The result of the prompt notifications sent to the user and the subsequent response of the user to the sent prompts may be logged and used as additional training data for the machine-language classifier to further refine the value of the set of weights.

In particular embodiments, the candidate prompt notifications may be ranked in accordance with the respective value of the linear predictor function for each of the candidate prompt notifications using the values of the features for the particular user. The top-ranked candidate prompt notifications are identified to determine which of the top-ranked prompt notifications should be sent. In particular embodiments, the candidate prompt notifications are identified based on the value of the predictor function for a particular user being above a pre-determined threshold value. The subsequent response by the user to the prompt notification may be logged.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims, but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
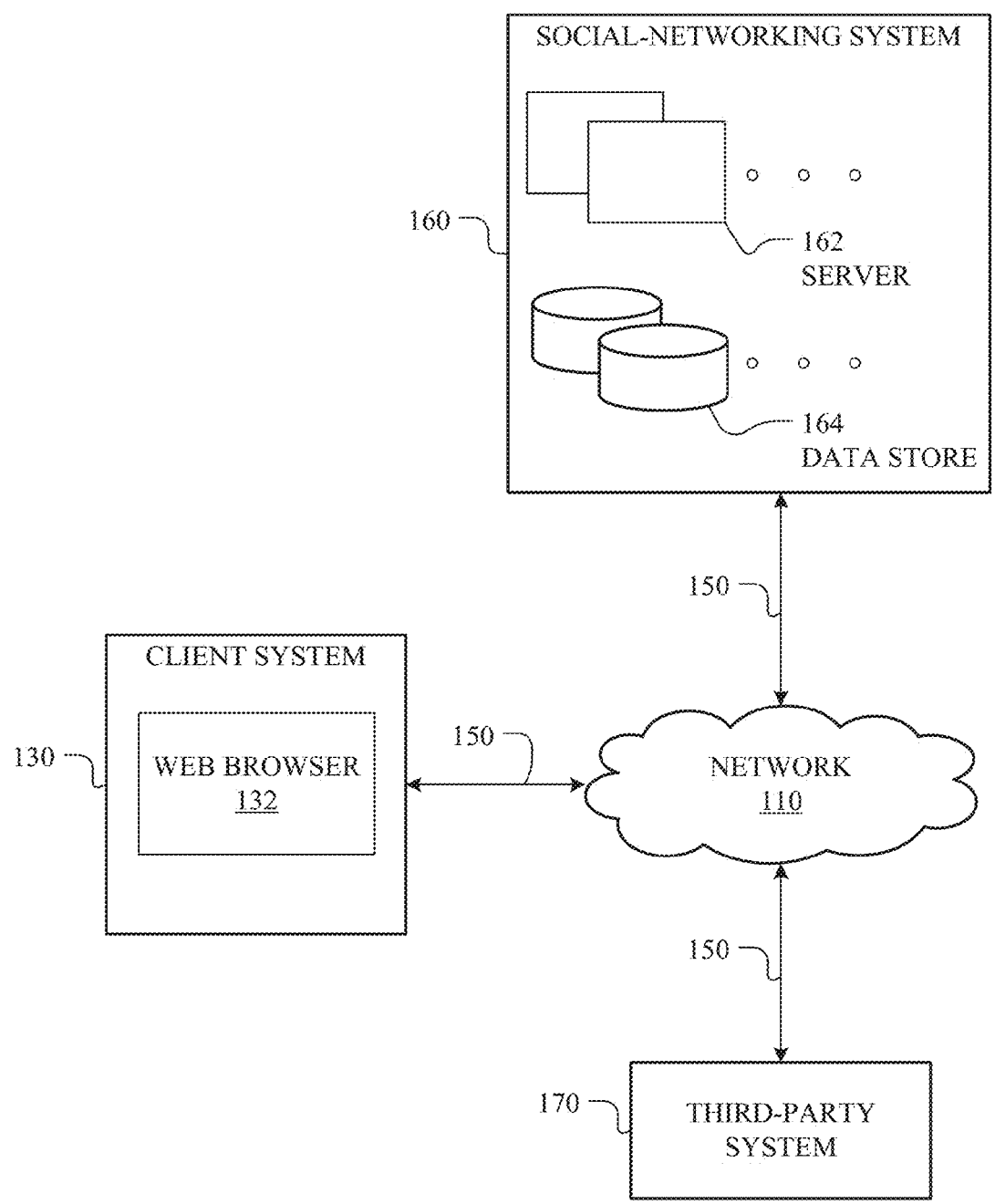
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, global-positioning system (GPS) device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user of client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate with client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110.

In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162.

In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term friend may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interface (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as for example coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may prompt users to post content stored on a respective client system 130 or content associated with an event. As an example and not by way of limitation, social-networking system 160 may send a "prompt" notification to client system 130 that prompts a user to share a photo that is stored on their client system 130. As another example, social-networking system 160 may display a pop-up window on client system 130 that prompts the user to check-in while they are a particular landmark. Herein, the term "prompt" may refer to any suitable communication to a user with regard to performing an action on social-networking system 160. Such communications or "prompt" notifications may be sent through one or more delivery channels, e.g., sent by one or more communication media (e.g., short-messaging service (SMS) message, multi-media messaging service (MMS) message, e-mail, communication related to a particular application, voice, pop-up window) to one or more unique endpoints (e.g., a telephone number, an e-mail address, a particular client device as specified by a unique device identifier, a particular user account for the particular application or for a client system 130).

In particular embodiments, prompt notifications may be delivered by way of a number of different delivery channels that may include one or more uniquely-identified endpoints and one or more communication media. In some embodiments, a particular communication medium may be able to deliver a prompt notification to more than one endpoint—for example, a third-party application such as SNAPCHAT (communication media) may be installed on the user's smartphone client device (first endpoint) and also on the user's laptop (second endpoint). In particular embodiments, different delivery channels may be selected for prompt notifications based on the user's available delivery channels and the status thereof. Information about the user's available delivery channels may be retrieved from the registration data store (e.g., information to enable the delivery of the prompt notification to a SNAPCHAT application). Different delivery channels or endpoint options for prompt notifications may also be selected based on the user's current delivery context, which may include the device status.

In particular embodiments, social-networking system 160 may include a variety of servers, sub-systems, programs, modules, logs, and data stores. In particular embodiments, social-networking system 160 may include one or more of the following: a web server, messaging server, action logger, API-request server, relevance-and-ranking engine, content-object classifier, notification controller, action log, messaging log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposure to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2A:
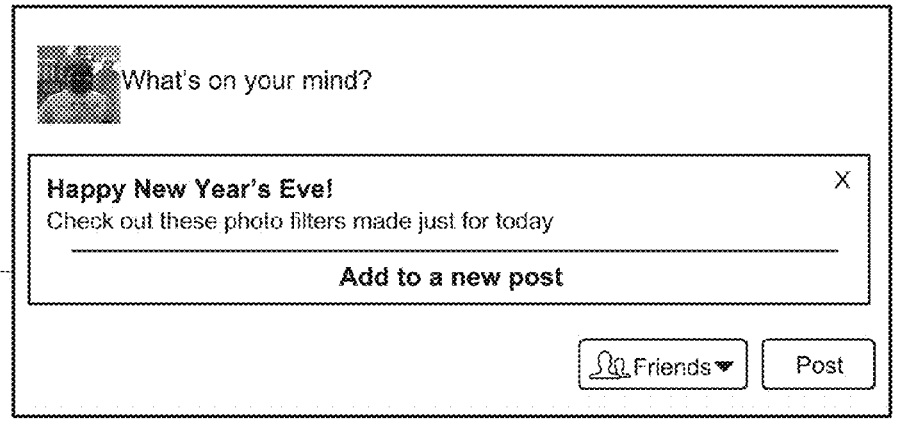
FIGS. 2A-B illustrate example candidate prompt notifications.
Figure 2B:
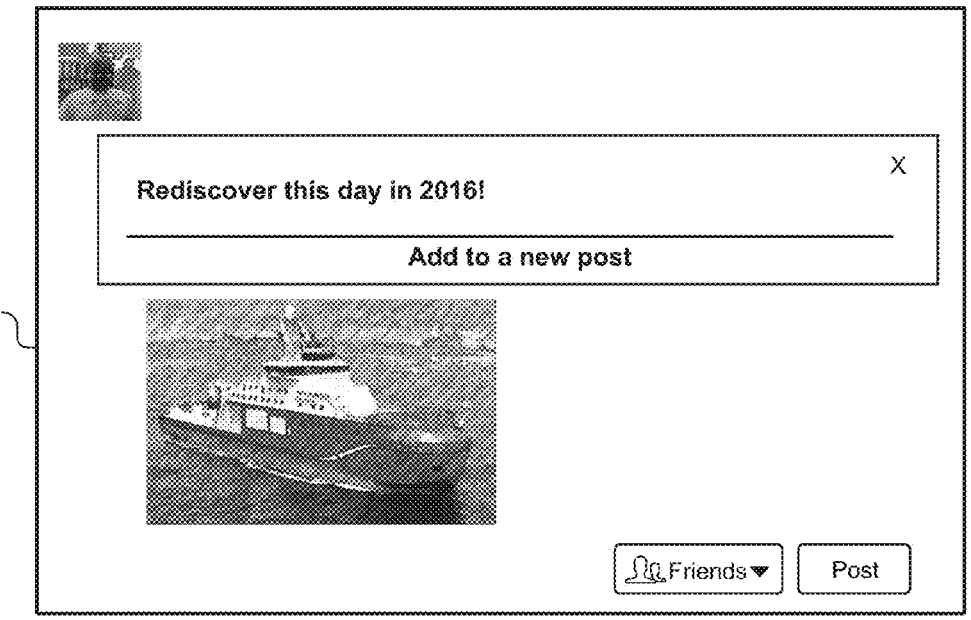

FIGS. 2A-B illustrate example candidate prompt notifications. Social-networking system 160 may provide a "prompt" or prompt notification 200A-B to one or more client systems 130 for users to post content stored on a respective client system 130 or content associated with an event or geolocation, as described herein. As an example and not by way of limitation, a prompt notification 200A-B may prompt to perform an action on social-networking system 160. Social-networking system 160 may generate a number of prompt notifications 200A-B that are candidates to be sent to a particular user based on a relative ranking of each candidate prompt notifications. As an example and not by way of limitation, different types of candidate notifications 200A-B may include photo reminders, clipboard links, souvenirs (e.g., photo cluster or previously posted photo), cultural events (e.g., dates of religious significance), occasions (e.g., birthday or anniversary), sport events, current location (e.g., a city or airport being visited), or thank-you (e.g., birthday) prompt notifications). As described below, one or more of the candidate prompt notifications 200A-B may be provided, based at least in part on the ranking, to one or more client systems 130 of the user. In particular embodiments, the ranking or interaction score of each of the provided candidate notifications 200A-B satisfies a predetermined threshold value. Although this disclosure illustrates and describes particular prompt notifications, this disclosure contemplates any suitable prompt notification implemented in any suitable form or channel, such as for example SMS message, video, or pop-up window.

Figure 3:
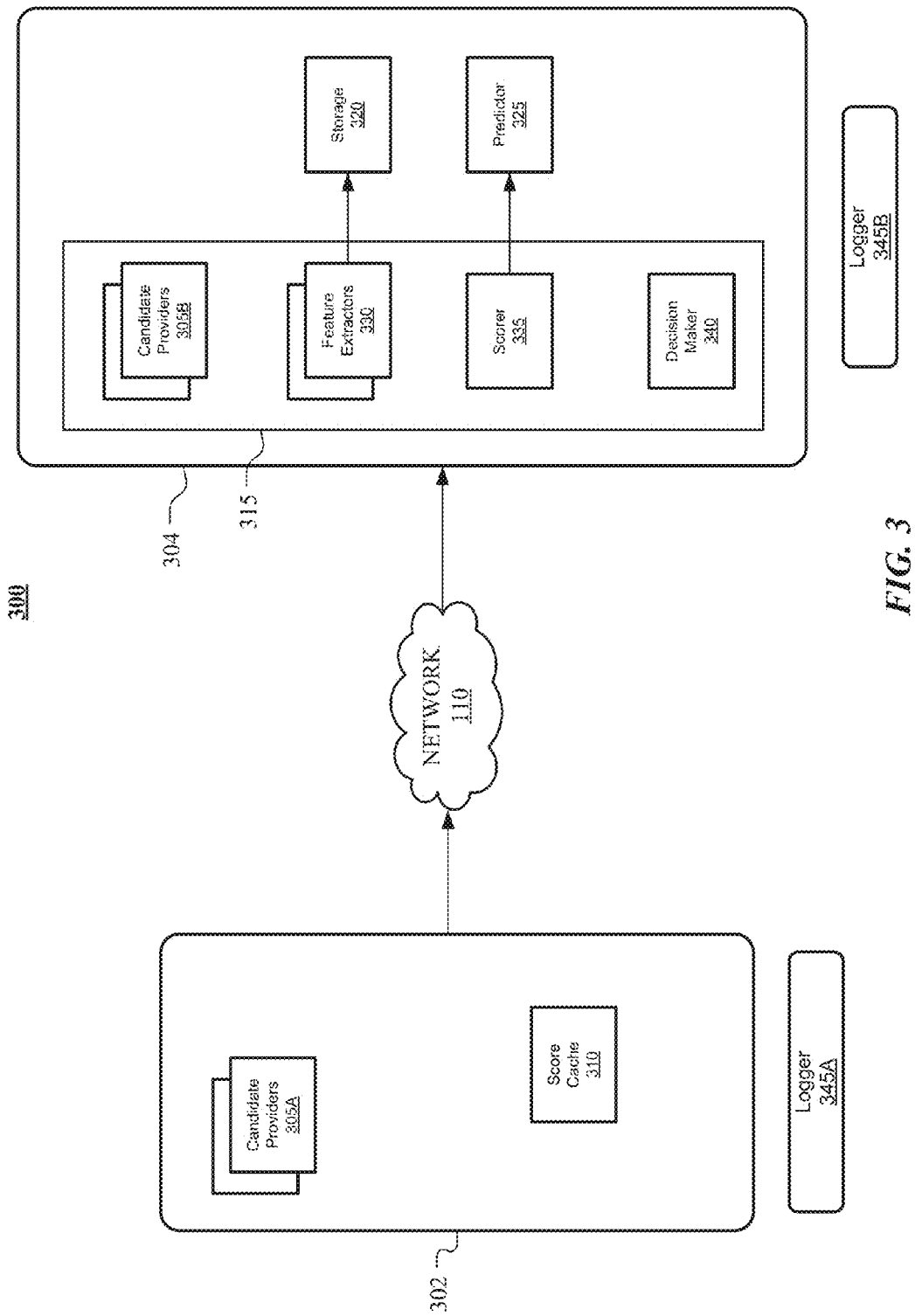
FIG. 3 illustrates an example prompt-ranking system.

FIG. 3 illustrates an example prompt-ranking system. As described above, client system 130 may be connected to server 162 through network 110. In particular embodiments, a prompt-ranking system 300 may have a client-side component 302 and a server-side component 304. As illustrated in the example of FIG. 3, client-side component 302 of prompt-ranking system 300 may include one or more candidate providers 305A, score cache 310, and logger 345A. In particular embodiments, server-side component 304 of the prompt-ranking system 300 may include a prompt ranker 315, storage 320, predictor 325, and logger 345B. In particular embodiments, prompt ranker 315 may include one or more candidate providers 305B, a feature extractor 330, scorer 335, and decision maker 340, as illustrated in the example of FIG. 3. As an example and not by way of limitation, candidate providers 305A of client-side component 302 may generate prompts related to content stored on client system 130 (e.g., photos or clipboard link). As another example, candidate providers 305B of server-side component 304 may generate prompt notifications related to social-graph information (e.g., interests or location) of the user.

Feature extractor 330 of prompt ranker 315 may include instructions or commands for retrieving the respective features associated with the candidate prompt notifications 200A-B that are stored in storage 320 and computing the value of the features used in the feature vectors, described below. Scorer 335 may include instructions for computing an interaction score that is based on the value of the features computed by feature extractor 330 and a predictor function to determine the weighting of the features, as described below. Predictor 325 may include instructions to compare the calculated interaction score to a pre-determined threshold value. Decision maker 340 may decide whether a particular candidate prompt notification 200A-B is sent to a client system 130 of a user based at least in part on the comparison of the interaction score to the pre-determined threshold value. Decision maker 340 may also consider other factors (e.g., current location of the user) to determine whether to send a particular candidate prompt notification to the user. Although this disclosure describes a prompt ranker having particular modules that perform particular functions, this disclosure contemplates a prompt ranker having any suitable modules that perform any suitable functions for ranking prompt notifications.

In particular embodiments, candidate prompt notifications 200A-B from candidate providers 305A-B may be ranked based on an interaction score that is calculated using a posting probability and dismissal probability associated with each type of candidate prompt notification 200A-B. The interaction score may represent a probability that the user will interact with a particular candidate or type of candidate prompt notifications 200A-B. Herein, the term posting probability may refer to a probability that a particular user performs a positive action (e.g., post) with regard to a particular type of prompt notification. Furthermore, the term dismissal probability may refer to a probability that a particular user performs a negative action (e.g., dismiss) with regard to the particular type of prompt notification 200A-B. In particular embodiments, score cache 310 of client-side component 302 may receive the respective interaction score for candidate prompt notifications 200A-B associated with candidate providers 305A from scorer 335 of server-side component 304.

In particular embodiments, the posting probability and dismissal probability may be evaluated using features or characteristics that correspond to how users interact each type of candidate prompt notifications 200A-B. In particular embodiments, some of the features may have a time-dependency. For example, some features may more heavily weigh recent activity over past activity. As another example, some features may measure the activity of a pre-determined period of time (e.g., minutes, hours, days, etc.). As another example, one or more features may measure interactions that occur after a particular type of interaction (e.g., since last post). In particular embodiments, one or more of the features may be a feature that is derived from two or more other features, such as, for example, a post rate over a pre-determined period of time that may be calculated from the number of posts divided by the number of prompt notifications 200A-B viewed by the user over the pre-determined period of time.

A feature vector is a vector of numerical "features" or independent variables that represent an output, in this case the probability that a particular user will interact with the one or more candidate prompt notifications 200A-B. As an example and not by way of limitation, features may correspond to observable signals that may be used to predict an outcome. In particular embodiments, the feature vector is based on usage or counter-based data collected on client system 130 or social-networking system 160 that may include the actions of the user in response to receiving a candidate prompt notification 200A-B, post rates associated with previous candidate prompt notifications 200A-B, or dismissal rates associated with each type of candidate prompt notifications 200A-B. In particular embodiments, the feature vector may include a user feature vector quantifying features of the user and a content feature vector quantifying features of the candidate prompt notification 200A-B. As an example and not by way of limitation, the user feature vector may include demographic information or interests of the user. As another example, the content feature vector may include the number of times a particular type of prompt notification 200A-B has been seen by the user, the number of times a particular type of prompt notification has been seen by a demographic similar to the user, or a posting rate for the particular type of prompt notification 200A-B. In particular embodiments, when the user receives a prompt notification 200A-B on client system 130, the activity of the user with regard to the prompt notification 200A-B (e.g., posting content or dismissal) may be logged by logger 345A and client-side component 302 may subsequently send the logged actions to server-side component 304 for the updating the interaction score or the candidate ranking of the candidate prompt notifications. In particular embodiments, similar activity on social-networking system 160 may be logged by logger 345B and the logged actions used the updating the interaction scoring or ranking of the candidate prompt notifications 200A-B by scorer 335.

Classification is the correlation of an output to a given input (e.g., posting probability to the previous posting or dismissal rates). Classification may be performed using a predictor function that is constructed using a set of "training" data that includes an input vector and an answer vector. A machine-learning classifier algorithm may combine (e.g., through a dot product) the input vector with one or more weights to construct a linear predictor function to best fit the input vector to the answer vector. As an example and not by way of limitation, classification algorithms may include support vector machine (SVM), Naive Bayes, Adaptive Boosting (AdaBoost), Random Forest, Gradient Boosting, K-means clustering, Density-based Spatial Clustering of Applications with Noise (DBSCAN), or Neural Network algorithms.

In particular embodiments, the training data may be obtained from the logged actions of a number of users with regard to the candidate prompt notifications 200A-B and the signals associated with each user with regard to the respective candidate prompt notification 200A-B. As an example and not by way of limitation, the input vector may be a vector of the posting signals (e.g., posting rate for a particular type of candidate prompt notification within a pre-determined amount of time (e.g., 10 minutes), number of times the user has seen a prompt notification 200A-B over a pre-determined amount of time (e.g., 1 hour), or an amount of time since the user posted content in response to a particular type of candidate prompt notification 200A-B), and dismissal signals (e.g., recent dismissal rate of candidate prompt notifications 200A-B, dismissal rate for users with similar demographics, dismissal rate in the local time zone during the past hour). Furthermore, the corresponding answer vector may be a value corresponding to a "1" (e.g., content was posted) or "0" (e.g., prompt notification was dismissed). For example, the user may receive a prompt notification 200A-B asking the user to share a photo or "check-in" while the user is at a historical landmark. The response (e.g., dismissal of prompt notification) of the user may be logged by logger 345A. In particular embodiments, the input vector may include information identifying the user, current location of the user, information of the user (e.g., demographics), or content factors (e.g., dismissal or posting signals) and the weights of the classifier may also take these content factors into account. In particular embodiments, the output vector of the machine-learning classifier may be whether or not the user posted content in response to a prompt notification 200A-B and the output vector may be compared to the answer vector to "train" the predictor function of the machine-learning classifier.

In particular embodiments, the feature vector of a particular user may be processed using the predictor function that is constructed using a set of "training" data, described above. Decision maker 304 may infer whether the user will or will not respond to the prompt notification 200A-B by sharing content through the output of the predictor function. As an example and not by way of limitation, the user performing a socially-relevant activity with respect to social-networking system 160. For example, social-networking system 160 may provide a prompt notification 200A-B prompting the user check-in at a geolocation associated with the current location, post a photo of the current location, or post content related to a holiday that is occurring (e.g., Fourth of July parade).

In particular embodiments, the social-networking system 160 may consider a variety of variables when determining respective weights for various factors used to calculate the interaction score, such as, for example, the time since the previous prompt notification 200A-B, decay factors, frequency of posting content, relationship to social-graph entities connected to the object, short- or long-term averages of user actions, user feedback, other suitable variables, or any combination thereof. As described above, the interaction score may include a decay factor that causes the strength of the signal provided by particular actions to decay with time, such that more recent actions are more relevant when calculating the coefficient. The ratings and weights may be continuously updated based on the continued tracking of the actions upon which the interaction score is based. Any type of process or algorithm may be employed for assigning, combining, averaging, and so forth the ratings for each feature and the weights assigned to the features. In particular embodiments, social-networking system 160 may determine the interaction score using machine-learning algorithms trained on historical actions and past user responses, or data farmed from users by exposing them to various options and measuring responses. Although this disclosure describes calculating an interaction score in a particular manner, this disclosure contemplates calculating an interaction score in any suitable manner.

Figure 4:
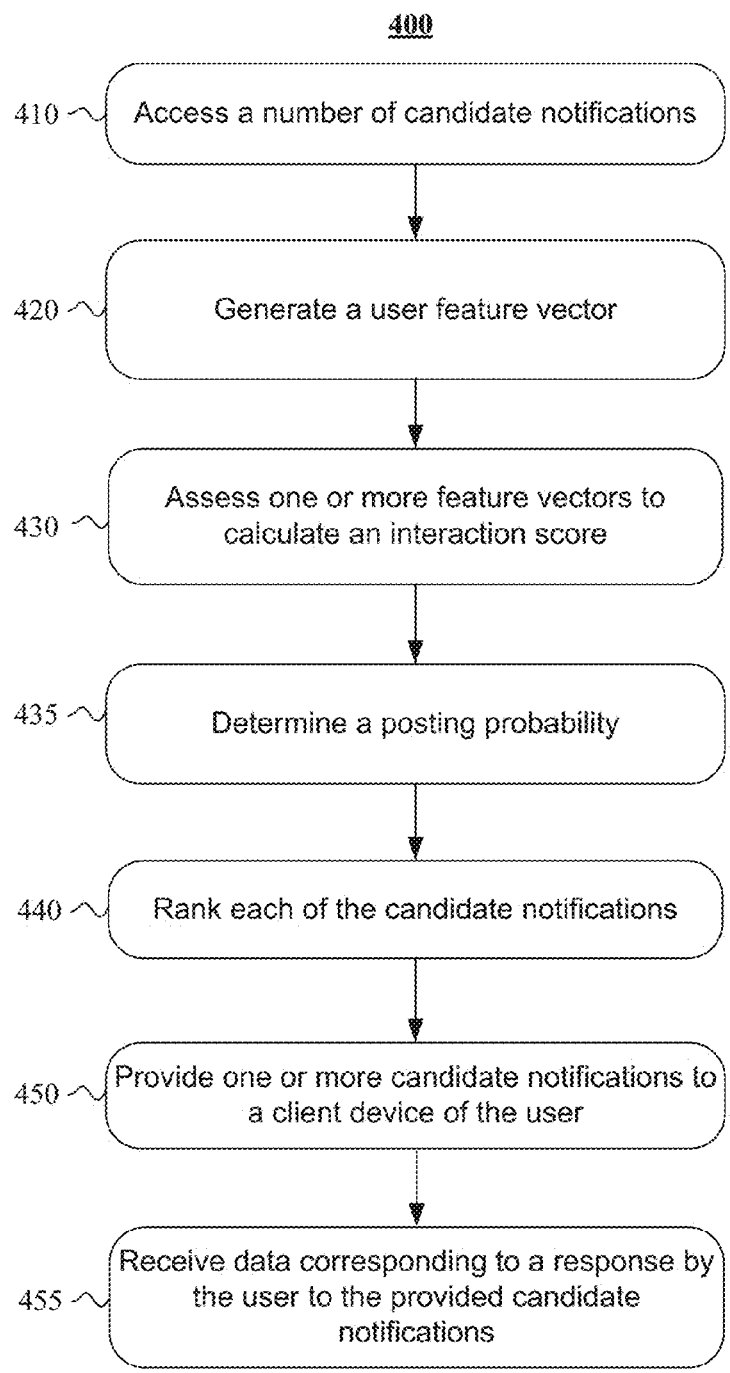
FIG. 4 illustrates an example method for ranking candidate prompt notifications.

FIG. 4 illustrates an example method for ranking candidate prompt notifications. The method 400 may start at step 410, where a computing device of the social-networking system may access a number of candidate notifications 200A-B for a user of a social-networking system that are stored on the social-networking system. As described above, each of the candidate notifications 200A-B includes content prompting the user to perform an action on the social-networking system. At step 420, a computing device of the social-networking system may generate a user feature vector quantifying features of the user. At step 430, a computing device of the social-networking system may assess, using a machine-learning model, one or more feature vectors in order to calculate an interaction score for each of the candidate notifications. In particular embodiments, the one or more feature vectors include the user feature vector. In particular embodiments, at step 435, a computing device of the social-networking system determines a posting probability corresponding to a probability that the user will perform the action associated with the respective candidate notification. At step 440, a computing device of the social-networking system may rank each of the candidate notifications based at least in part on the respective calculated interaction score. At step 450, a computing device of the social-networking system may provide, based at least in part on the ranking, one or more of the candidate notifications to a client device of the user. In particular embodiments, each of the provided candidate notifications satisfies a pre-determined threshold value. In particular embodiments, at step 455, a computing device of the social-networking system may receive data corresponding to a response by the user to the provided candidate notifications. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for ranking notifications, including the particular steps of the method of FIG. 4, this disclosure contemplates any suitable method for ranking notifications, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
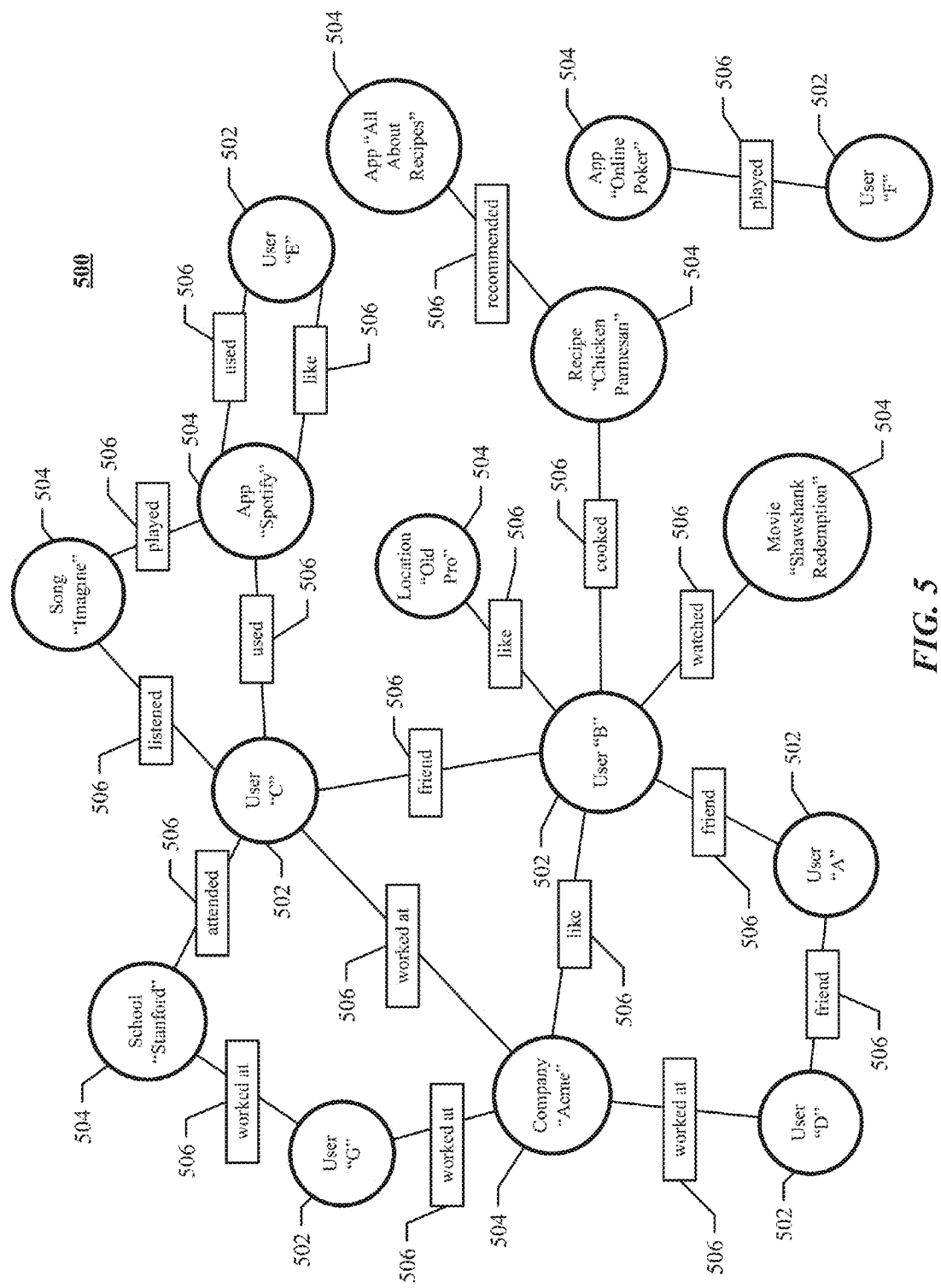
FIG. 5 illustrates an example social graph.

FIG. 5 illustrates an example social graph. In particular embodiments, social-networking system 160 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 160, client system 150, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, contact information, birthdate, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 150 to transmit to social-networking system 160 a message indicating the user's action. In response to the message, social-networking system 160 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 164. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 4 between user node 502 for user "E" and concept node 504 for "SPOTIFY").

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 150) may indicate that he or she likes the concept represented by the concept node 504 by clicking or selecting a "Like" icon, which may cause the user's client system 130 to transmit to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts.

Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient. The affinity coefficient may represent or quantify the strength of a relationship between particular objects associated with the online social network. The affinity coefficient may also represent a probability or function that measures a predicted probability that a user will perform a particular action based on the user's interest in the action. In this way, a user's future actions may be predicted based on the user's prior actions, where the affinity coefficient may be calculated at least in part on the history of the user's actions. Affinity coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate an affinity coefficient. These factors may include, for example, user actions, types of relationships between objects, location information, other suitable factors, or any combination thereof. In particular embodiments, different factors may be weighted differently when calculating the affinity coefficient. The weights for each factor may be static or the weights may change according to, for example, the user, the type of relationship, the type of action, the user's location, and so forth. Ratings for the factors may be combined according to their weights to determine an overall affinity coefficient for the user. As an example and not by way of limitation, particular user actions may be assigned both a rating and a weight while a relationship associated with the particular user action is assigned a rating and a correlating weight (e.g., so the weights total 100%). To calculate the affinity coefficient of a user towards a particular object, the rating assigned to the user's actions may comprise, for example, 60% of the overall affinity coefficient, while the relationship between the user and the object may comprise 40% of the overall affinity coefficient. In particular embodiments, the social-networking system 160 may consider a variety of variables when determining weights for various factors used to calculate an affinity coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, an affinity coefficient may include a decay factor that causes the strength of the signal provided by particular actions to decay with time, such that more recent actions are more relevant when calculating the affinity coefficient. The ratings and weights may be continuously updated based on continued tracking of the actions upon which the affinity coefficient is based. Any type of process or algorithm may be employed for assigning, combining, averaging, and so forth the ratings for each factor and the weights assigned to the factors. In particular embodiments, social-networking system 160 may determine affinity coefficients using machine-learning algorithms trained on historical actions and past user responses, or data farmed from users by exposing them to various options and measuring responses. Although this disclosure describes calculating affinity coefficients in a particular manner, this disclosure contemplates calculating affinity coefficients in any suitable manner.

In particular embodiments, social-networking system 160 may calculate an affinity coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate an affinity coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high affinity coefficient with respect to the concept "coffee". Particular actions or types of actions may be assigned a higher weight and/or rating than other actions, which may affect the overall calculated affinity coefficient. As an example and not by way of limitation, if a first user emails a second user, the weight or the rating for the action may be higher than if the first user simply views the user-profile page for the second user.

In particular embodiments, social-networking system 160 may calculate an affinity coefficient based on the type of relationship between particular objects. Referencing the social graph 500, social-networking system 160 may analyze the number and/or type of edges 506 connecting particular user nodes 502 and concept nodes 504 when calculating an affinity coefficient. As an example and not by way of limitation, user nodes 502 that are connected by a spouse-type edge (representing that the two users are married) may be assigned a higher affinity coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the affinity coefficient for that object. As an example and not by way of limitation, if a user is tagged in first photo, but merely likes a second photo, social-networking system 160 may determine that the user has a higher affinity coefficient with respect to the first photo than the second photo because having a tagged-in-type relationship with content may be assigned a higher weight and/or rating than having a like-type relationship with content. In particular embodiments, social-networking system 160 may calculate an affinity coefficient for a first user based on the relationship one or more second users have with a particular object. In other words, the connections and affinity coefficients other users have with an object may affect the first user's affinity coefficient for the object. As an example and not by way of limitation, if a first user is connected to or has a high affinity coefficient for one or more second users, and those second users are connected to or have a high affinity coefficient for a particular object, social-networking system 160 may determine that the first user should also have a relatively high affinity coefficient for the particular object. In particular embodiments, the affinity coefficient may be based on the degree of separation between particular objects. The lower affinity coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher affinity coefficient than entities that are further apart in the social graph 500.

In particular embodiments, social-networking system 160 may calculate an affinity coefficient based on location information. Objects that are geographically closer to each other may be considered to be more related or of more interest to each other than more distant objects. In particular embodiments, the affinity coefficient of a user towards a particular object may be based on the proximity of the object's location to a current location associated with the user (or the location of a client system 140 of the user). A first user may be more interested in other users or concepts that are closer to the first user. As an example and not by way of limitation, if a user is one mile from an airport and two miles from a gas station, social-networking system 160 may determine that the user has a higher affinity coefficient for the airport than the gas station based on the proximity of the airport to the user.

In particular embodiments, social-networking system 160 may perform particular actions with respect to a user based on affinity coefficient information. Affinity coefficients may be used to predict whether a user will perform a particular action based on the user's interest in the action. An affinity coefficient may be used when generating or presenting any type of objects to a user, such as advertisements, search results, news stories, media, messages, notifications, or other suitable objects. The affinity coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on affinity coefficient information. Content objects may be provided or selected based on affinity coefficients specific to a user. As an example and not by way of limitation, the affinity coefficient may be used to generate media for the user, where the user may be presented with media for which the user has a high overall affinity coefficient with respect to the media object. As another example and not by way of limitation, the affinity coefficient may be used to generate advertisements for the user, where the user may be presented with advertisements for which the user has a high overall affinity coefficient with respect to the advertised object. In particular embodiments, social-networking system 160 may generate search results based on affinity coefficient information. Search results for a particular user may be scored or ranked based on the affinity coefficient associated with the search results with respect to the querying user. As an example and not by way of limitation, search results corresponding to objects with higher affinity coefficients may be ranked higher on a search-results page than results corresponding to objects having lower affinity coefficients.

In particular embodiments, social-networking system 160 may calculate an affinity coefficient in response to a request for an affinity coefficient from a particular system or process. To predict the likely actions a user may take (or may be the subject of) in a given situation, any process may request a calculated affinity coefficient for a user. The request may also include a set of weights to use for various factors used to calculate the affinity coefficient. This request may come from a process running on the online social network, from a third-party system 170 (e.g., via an API or other communication channel), or from another suitable system. In response to the request, social-networking system 160 may calculate the affinity coefficient (or access the affinity coefficient information if it has previously been calculated and stored). In particular embodiments, social-networking system 160 may measure an affinity with respect to a particular process. Different processes (both internal and external to the online social network) may request an affinity coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 504 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 500. A privacy setting may be specified for one or more edges 506 or edge-types of social graph 500, or with respect to one or more nodes 502, 504 or node-types of social graph 500. The privacy settings applied to a particular edge 506 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 504 connected to a user node 502 of the first user by an edge 506. The first user may specify privacy settings that apply to a particular edge 506 connecting to the concept node 504 of the object, or may specify privacy settings that apply to all edges 506 connecting to the concept node 504. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wishes to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Figure 6:
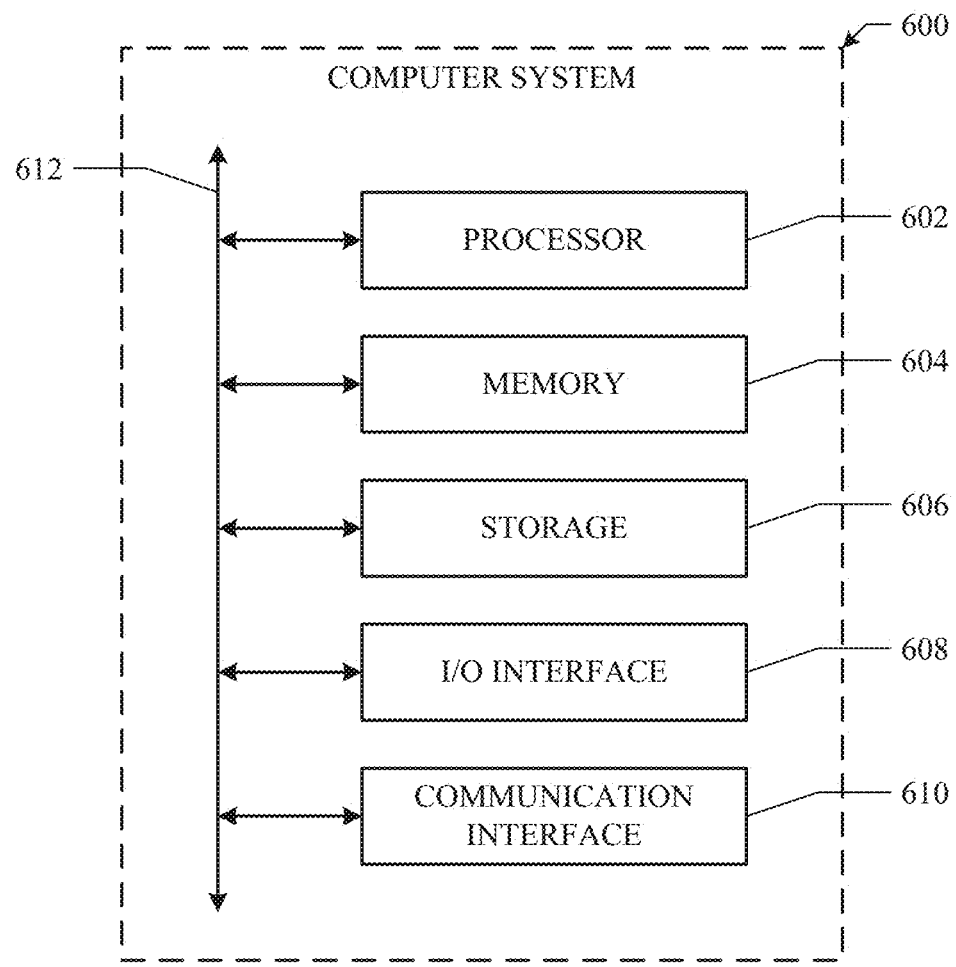
FIG. 6 illustrates an example computing system.

FIG. 6 illustrates example computing system. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device and for a user of a social-networking system, accessing a plurality of candidate notifications stored on the social-networking system, wherein:
   each of the candidate notifications has an associated type and comprise a prompt to perform an action on the social-networking system; and
   the associated type is based at least in part on user-content or social-graph information of the user;
   by the computing device, generating a user feature vector quantifying features of the user;
   by the computing device, calculating an interaction score for each of the candidate notifications using a machine-learning model that is based on at least in part on interactions performed by a plurality of users on the social-networking system in response to previous notifications of a same associated type as the plurality of candidate notifications and one or more feature vectors comprising information of the user;
   by the computing device, ranking each of the candidate notifications based at least in part on the respective calculated interaction score; and
   by the computing device, providing, based at least in part on the ranking, one or more of the candidate notifications to a client device of the user, wherein each of the provided candidate notifications satisfies a pre-determined threshold value.

2. The method of claim 1, wherein the one or more feature vectors further comprises, for each of the candidate notifications, a content feature vector quantifying features of the candidate notification.

3. The method of claim 2, wherein one or more of the features of the content feature vector is time dependent.

4. The method of claim 1, wherein calculating the interaction score further comprises:
   for each of the for the candidate notifications, determining a posting probability corresponding to a probability that the user will perform the action associated with the respective candidate notification; and
   wherein the interaction score is calculated based on the posting probability.

5. The method of claim 4, wherein calculating the interaction score further comprises for each of the for the candidate notifications, determining a dismissal probability corresponding to a probability that the user dismisses the respective candidate notification, and wherein the score calculated further based on the dismissal probability.

6. The method of claim 1, wherein the machine-learning model applies one or more weights to one or more of the features of at least one of the one or more feature vectors.

7. The method of claim 6, further comprising receiving data corresponding to a response by the user to the provided candidate notifications.

8. The method of claim 7, further comprising updating a value of one or more of the weights based on the received data.

9. The method of claim 1, wherein one or more of the features of the user feature vector corresponds to activity measured during a pre-determined amount of time.

10. The method of claim 1, wherein the user feature vector comprises data corresponding to demographics of the user.

11. The method of claim 1, wherein the user feature vector comprises data corresponding to a current location of the user.

12. The method of claim 1, wherein the user feature vector quantifies features comprising historical information regarding past interactions by the user with prompts to perform actions on the social-networking system, or one or more interests of the user, past activity of the user on the social-networking system.

13. The method of claim 12, wherein the features comprising-historical information regarding past interactions classify the past interactions based on a type of the past interaction, a type of the candidate notification with which the user interacted, a determination as to whether or not the user performed the action, past interactions with other users on the social-networking system, or an amount of time spent interacting with the social-networking system.

14. The method of claim 1, wherein the action comprises posting content related to content stored on the client device, posting content related to a current location, posting content related to a cultural event, or posting content related to an user occasion.

15. One or more computer-readable non-transitory storage media embodying software configured when executed to:
   for a user of a social-networking system, access a plurality of candidate notifications stored on the social-networking system, wherein:
      each of the candidate notifications has an associated type and comprise a prompt to perform an action on the social-networking system; and
      the associated type is based at least in part on user-content or social-graph information of the user;
   generate a user feature vector quantifying features of the user;
   calculate an interaction score for each of the candidate notifications using a machine-learning model that is based on at least in part on interactions performed by a plurality of users on the social-networking system in response to previous notifications of a same associated type as the plurality of candidate notifications and one or more feature vectors comprising information of the user;
   rank each of the candidate notifications based at least in part on the respective calculated interaction score; and
   provide, based at least in part on the ranking, one or more of the candidate notifications to a client device of the user, wherein each of the provided candidate notifications satisfies a pre-determined threshold value.

16. The media of claim 15, wherein the one or more feature vectors further comprises, for each of the candidate notifications, a content feature vector quantifying features of the candidate notification.

17. The media of claim 15, wherein the software is further configured to:
   for each of the for the candidate notifications, determine a posting probability corresponding to a probability that the user will perform the action associated with the respective candidate notification; and wherein the interaction score is calculated based on the posting probability.

18. A device comprising:
   one or more processors; and
   one or more computer-readable non-transitory storage media coupled to the processors and embodying software configured when executed to:
   for a user of a social-networking system, access a plurality of candidate notifications stored on the social-networking system, wherein:
      each of the candidate notifications has an associated type and comprise a prompt to perform an action on the social-networking system; and
      the associated type is based at least in part on user-content or social-graph information of the user;
   generate a user feature vector quantifying features of the user;
   calculate an interaction score for each of the candidate notifications using a machine-learning model that is based on at least in part on interactions performed by a plurality of users on the social-networking system with in response to previous notifications of a same associated type as the plurality of candidate notifications and one or more feature vectors comprising information of the user;
   rank each of the candidate notifications based at least in part on the respective calculated interaction scores; and
   provide, based at least in part on the ranking, one or more of the candidate notifications to a client device of the user, wherein each of the provided candidate notifications satisfies a pre-determined threshold value.

19. The device of claim 18, wherein the one or more feature vectors further comprises, for each of the candidate notifications, a content feature vector quantifying features of the candidate notification.

20. The device of claim 18, wherein the software is further configured to:
   for each of the for the candidate notifications, determine a posting probability corresponding to a probability that the user will perform the action associated with the respective candidate notification; and wherein the interaction score is calculated based on the posting probability.

* * * * *